United States Patent
Essig et al.

Patent Number: 5,713,651
Date of Patent: Feb. 3, 1998

[54] MODULAR FRAME ASSEMBLY FOR AN EQUIPMENT CABINET

[75] Inventors: Robert A. Essig, Crystal; James E. Olsen, Plymouth; James E. Larson, Buffalo, all of Minn.

[73] Assignee: McQuay International, Minneapolis, Minn.

[21] Appl. No.: 607,472

[22] Filed: Feb. 27, 1996

[51] Int. Cl.⁶ ........................................ A47B 47/00
[52] U.S. Cl. .................. 312/265.4; 403/219; 403/230
[58] Field of Search .............................. 312/108, 111, 312/257.1, 265.1, 265.2, 265.3, 265.4; 403/217, 218, 219, 170, 171, 230

[56] References Cited

U.S. PATENT DOCUMENTS

| | | | |
|---|---|---|---|
| 3,087,768 | 4/1963 | Anderson et al. | 403/217 X |
| 3,305,255 | 2/1967 | Henderson | 403/219 |
| 3,746,417 | 7/1973 | Sasnett. | |
| 3,832,605 | 8/1974 | Clark, Jr. | 312/257.1 X |
| 4,040,694 | 8/1977 | Lascarrou. | |
| 4,257,333 | 3/1981 | Pollack | 108/144 |
| 4,665,838 | 5/1987 | Minshall | 108/153 X |
| 4,997,240 | 3/1991 | Schmalzl et al. | |
| 5,066,161 | 11/1991 | Pinney | 403/219 X |

FOREIGN PATENT DOCUMENTS

| | | | |
|---|---|---|---|
| 642359 | 6/1962 | Canada | 312/265.4 |
| 2659483 | 7/1978 | Germany | 361/829 |

*Primary Examiner*—Peter M. Cuomo
*Assistant Examiner*—Janet M. Wilkens
*Attorney, Agent, or Firm*—Patterson & Keough, P.A.

[57] ABSTRACT

A modular frame assembly for an equipment cabinet having a plurality of members releasably secured together is provided. A plurality of universal frame members are provided, each having a securing tab and an offset securing tab projecting therefrom. A countersunk bore is formed in each of the tabs and a plurality of fasteners are provided which are insertable into the bores to releasably secure the plurality of universal frame members together. This provides a modular frame assembly that allows disassembly of a single frame member by removing two of the fasteners at each corner. The third fastener remains in place and maintains the integrity of the remaining two frame members.

22 Claims, 8 Drawing Sheets

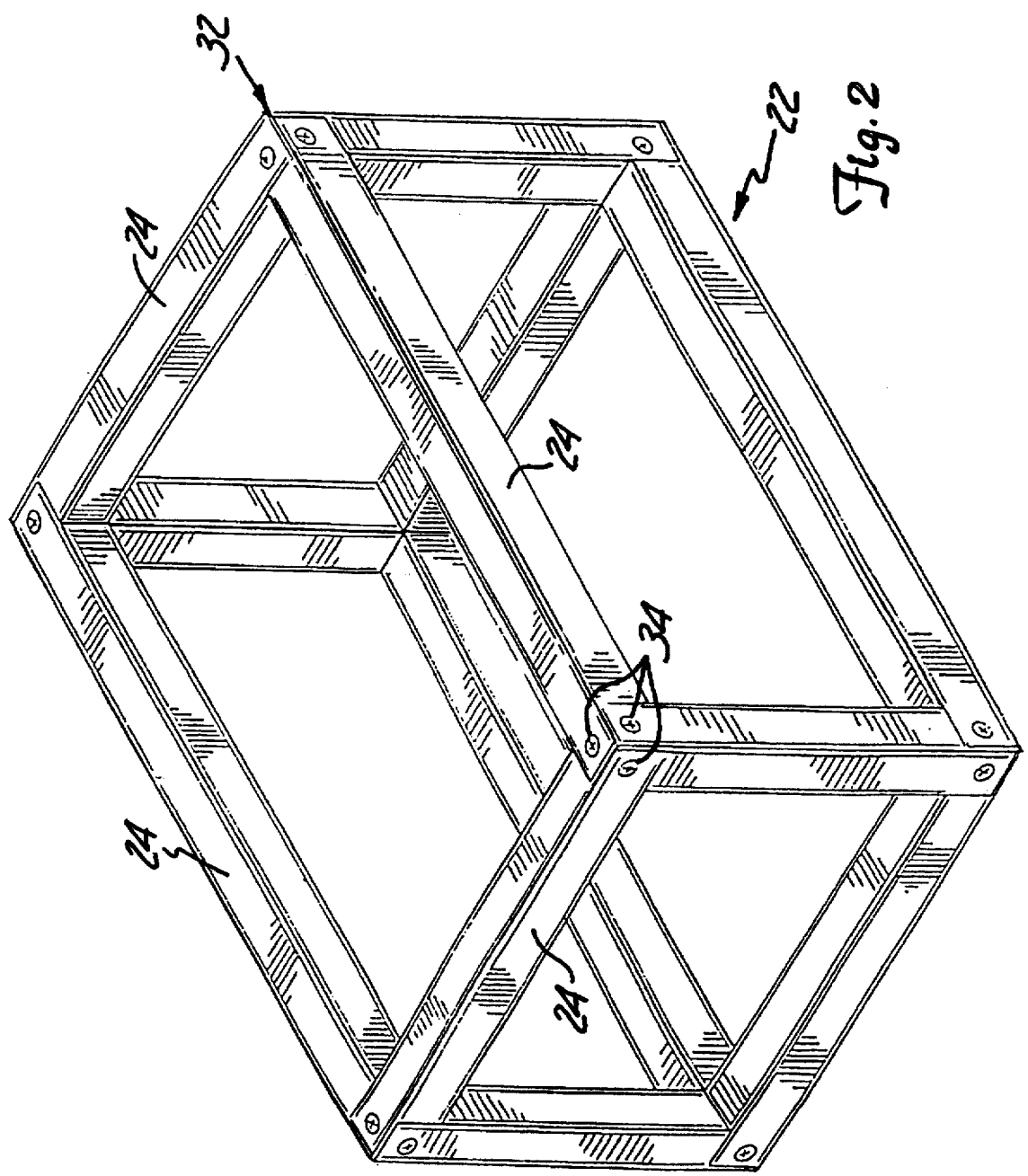

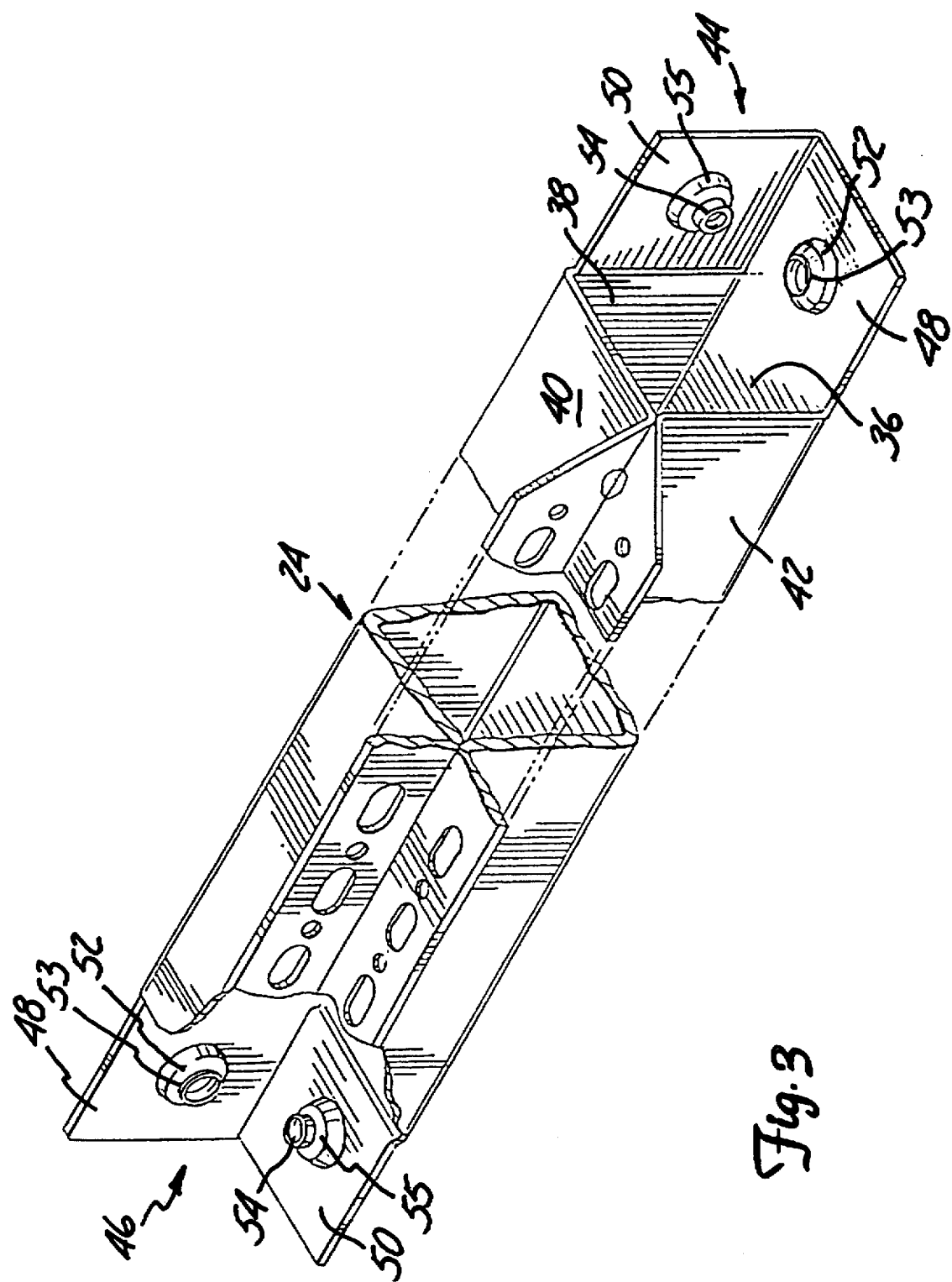

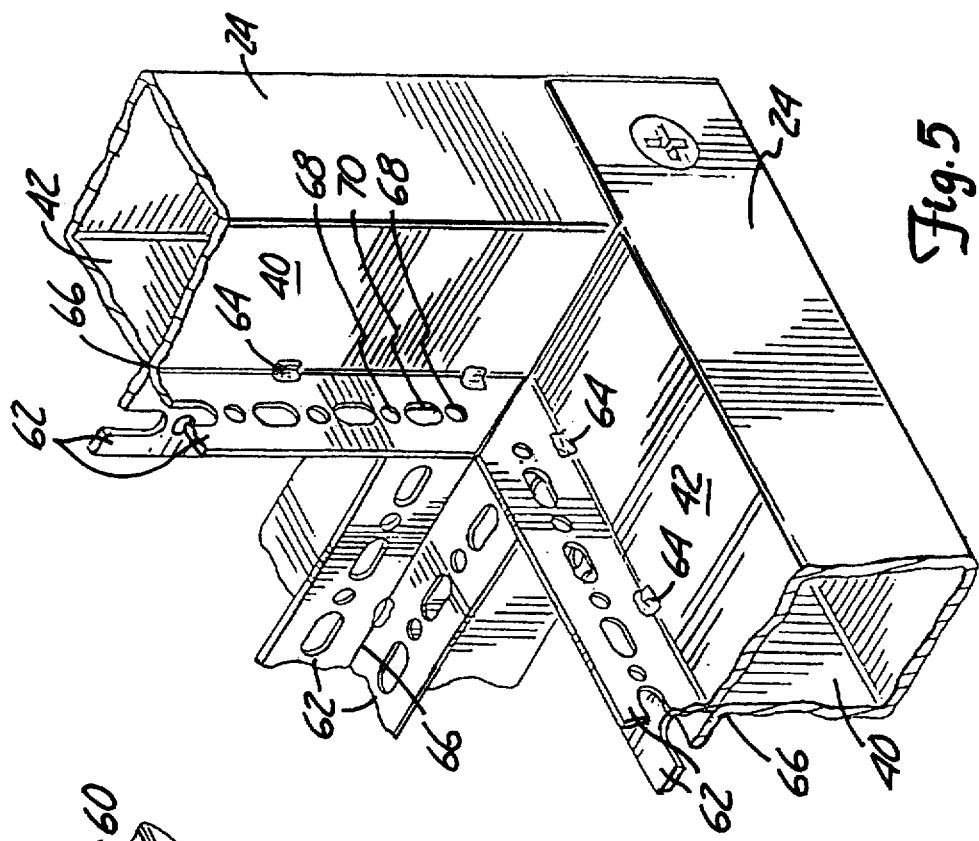
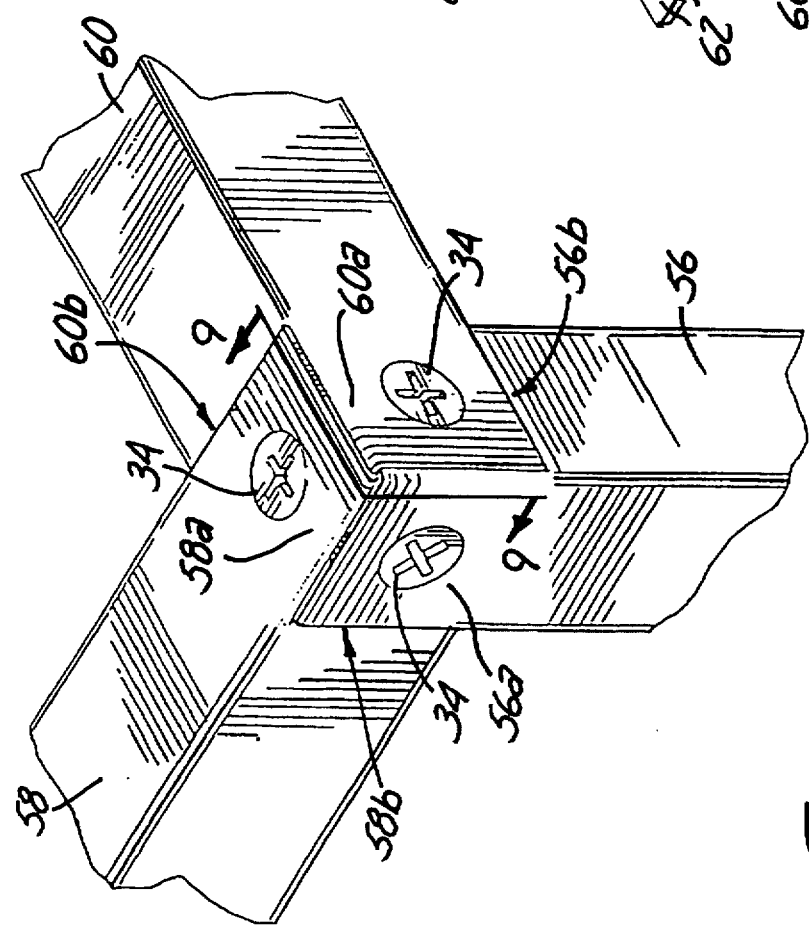

MODULAR FRAME ASSEMBLY FOR AN EQUIPMENT CABINET

FIELD OF THE INVENTION

The present invention is related to frame assemblies. In particular, the present invention is a modular frame assembly for an equipment cabinet.

BACKGROUND OF THE INVENTION

Equipment cabinets are not new. Nor are equipment cabinets having a plurality of frame members releasably secured together. Examples of known equipment cabinets are illustrated in U.S. Pat. No. 4,997,240 to Schmalzl, et al. and U.S. Pat. No. 4,040,694, to Lascarrou. The Schmalzl patent discloses a modular housing system having guide grooves having a keyhole shaped cross section and capping pieces at the ends. The capping pieces are connectable to one another via corner nodes that are provided with two pegs positioned diagonally opposite one another at three sides allocated to different corner plains. The Lascarrou patent discloses a cabinet and cubical formed by assembling framework members having at their ends cylindrical openings and conical cylindrical projections which are centered in the cylindrical openings and a screw inserted therein for retaining the framework.

Spatial constraints are a typical concern when dealing with heating, ventilation and air conditioning (HVAC) equipment. Often times HVAC equipment cabinets are located in small utility rooms, crowded basements or rooftops directly adjacent other equipment cabinets. In order to service the equipment in these cabinets it is often times required that the whole cabinet be disassembled. Also, it is often times required that the adjacent cabinets be moved to allow the disassembly of the cabinet housing the disabled equipment.

Instead of totally disassembling an equipment cabinet, one current practice for the removal of internal components of an equipment cabinet such as the coil or fan assembly is to pry the frame assembly apart, distorting the frame to get the components out. Repeated distortions to the frame assembly have a tendency to weaken the frame.

Moving equipment cabinets from one location to another typically requires complete disassembly of the equipment cabinet because the frame members of typical cabinets are usually very heavy. Additionally, typically if any pieces of the frame are removed, the other frame members no longer form easily moveable portions.

It would desirable to provide a frame assembly for an equipment cabinet that allows the removal of or access to internal equipment components without having to distort the frame, without having to move adjacent cabinets and without having to disassemble the entire cabinet. It would also be desirable to provide a frame assembly capable of easy transportation.

SUMMARY OF THE INVENTION

The present invention provides a modular frame assembly for an equipment cabinet having a plurality of members releasably secured together. At least first, second and third frame members are provided, each of which have a securing tab and an offset securing tab projecting therefrom. The securing tabs of the frame members mate with an offset securing tab of another frame member. In one embodiment, the securing tab of the first frame member mates with the offset securing tab of the second frame member, the securing tab of the second frame member mates with the offset securing tab of the third frame member, and the securing tab of the third frame member mates with the offset securing member of the first frame member.

A receiving cavity is formed in each of the tabs and a plurality of fasteners are provided which are insertable into the receiving cavities to releasably secure the first, second and third frame members together. This provides a modular frame assembly that allows disassembly of a single frame member by removing two of the fasteners at each corner. The third fastener remains in place and maintains the integrity of the remaining two frame members. Additionally, each frame member is preferably a universal member which allows either end to mate with any two other ends.

BRIEF DESCRIPTION OF THE DRAWINGS

FIG. 2 is a perspective view of a single modular frame assembly according to the present invention.

FIG. 3 is a perspective view of an individual frame member according to the present invention.

FIG. 4 is an enlarged perspective view of a corner of the modular frame assembly of FIG. 2.

FIG. 5 is an inside perspective view of a corner from a modular frame assembly according to the present invention.

DETAILED DESCRIPTION OF THE DRAWINGS

Figure 1:
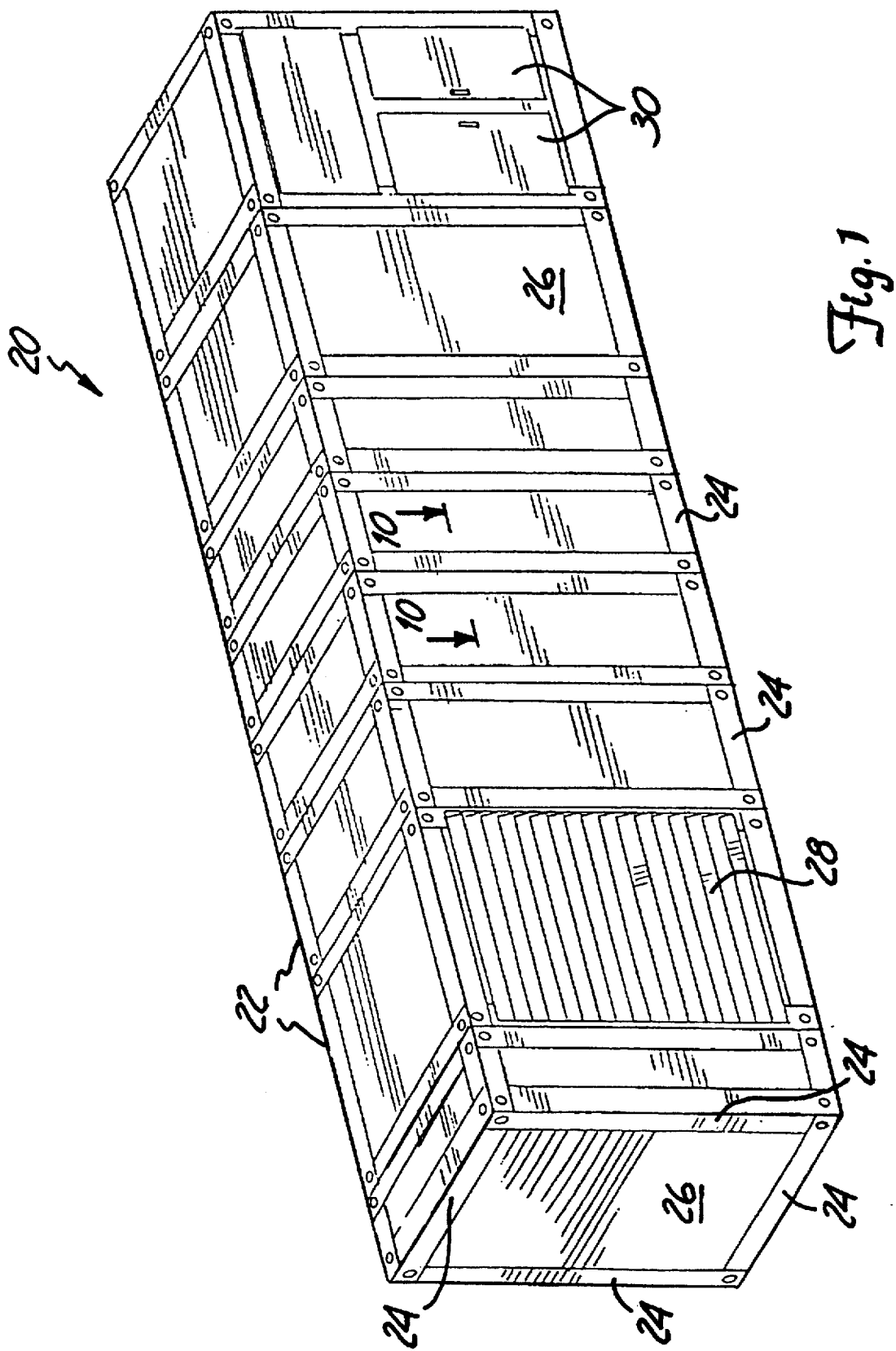
FIG. 1 is a perspective view of a plurality of modules joined together.

FIG. 1 is a perspective view of a heating, ventilation and air conditioning (HVAC) unit 20. Unit 20 is comprised of a number of individual modular frame assemblies 22 for housing individual components. Frame assemblies 22 are comprised of a plurality of individual frame members 24 and frame panels 26. Solid frame panels 26 may be replaced with ventilation grids 28 or access doors 30 as illustrated in FIG. 1 or other such enclosing member if desired. The present invention is directed to a unique embodiment of frame members 24 to allow frame assemblies 22 to be releasably secured together such that an individual frame member 24 can be removed while other frame members in the assembly remain secured.

FIG. 2 is a perspective view of an individual frame 22 assembly, similar to those illustrated in FIG. 1. Frame assembly 22 is comprised of twelve individual frame members 24 which are joined at eight corners 32 with three fasteners 34 at each corner. In the preferred embodiment of the present invention, frame members 24 are box channel frame members manufacturable in variable lengths so that frame assembly 22 may be constructed in a variety of heights, lengths and widths. The box channel construction can be seen in greater detail in FIGS. 4, 6, 7 and 10. It should be understood that other types of post or frame member constructions could also be used without departing from the spirit or scope of the present invention.

FIG. 3 is a perspective view of an individual frame member 24. As stated above, frame members 24 are preferably box channels having first, second, third and fourth sidewalls 36, 38, 40 and 42 respectively. Frame member 24 is illustrated having a first end 44 and a second end 46. In the preferred embodiment of the present invention, second end 46 is formed to be the mirror image of first end 44 such that each frame member 24 is a universal piece. Frame member 24 is preferably fabricated to be a universal part such that it may mate with two additional like parts to form a three axis corner which is square, rigid and strong. In the preferred embodiment, frame members 24 are fabricated from 690 galvanized steel, but other such materials are also considered within the spirit and scope of the invention. The Figures and the remaining description of the present invention are directed to universally formed frame members but it should be noted, however, that other embodiments of a universal frame member or non-universal frame members are also applicable to the present invention.

At first end 44 of frame member 24, first sidewall 36 extends beyond third and fourth sidewalls 40, 42 to form a securing tab 48. Also at the first end of frame member 24, second sidewall 38 extends beyond the third and fourth sidewalls to form an offset securing tab 50. Second end 46 also has a pair of securing tabs 48 and 50 extending from first and second sidewalls 36, 38, respectively. However, at second end 46, offset securing tab 50 is an extension of first sidewall 36 and securing tab 48 is an extension of second sidewall 38. At first end 44, offset securing tab 50 is offset inward towards the plane of fourth sidewall 42 and at second end 46 offset securing tab 50 is offset inward towards the plane of sidewall 40. Tabs 50 are offset to allow them to mate with other non offset tabs as will be described in detail below.

Figure 9:
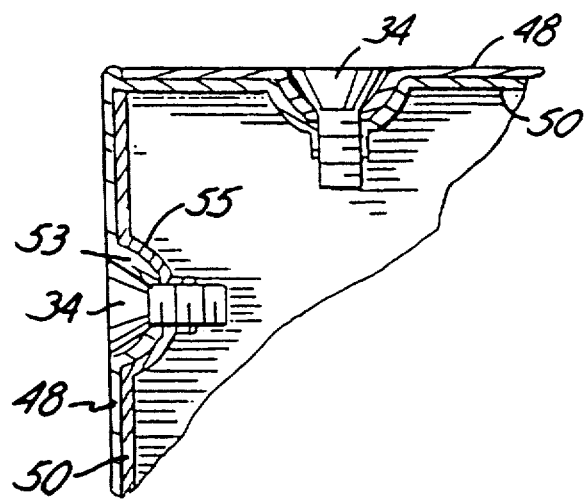
FIG. 9 is a cross-sectional view taken along line 9—9 of FIG. 4.

Securing tabs 48 each have a receiving cavity 52 formed therein and offset securing tabs 50 each have a receiving cavity 54 formed therein. Receiving cavities 52, 54 have mating cones 53, 55, respectively, surrounding them to allow a fastener to be mounted flush with securing tab 48 and to allow mating cone 53 to be seated in mating cone 55. This provides increased mechanical strength for the corner when frame members 24 are joined together. Additionally, mating cone 55 on offset tab 50 is extruded to provide additional engagement depth for fasteners 34. An example of how the mating cones of receiving cavities 52, 54 mate together is illustrated in FIG. 9.

FIG. 4 illustrates an enlarged perspective view of one of the corners from FIG. 2. FIG. 4 is illustrated as having first, second and third frame members 56, 58, 60, respectively, secured together via fasteners 34. Each of first, second and third frame members 56, 58, and 60, are manufactured like frame member 24 from FIG. 3, such that each of the frame members has a securing tab 56a, 58a and 60a, respectively, and an offset securing tab 56b, 58b and 60b. Offset securing tab 56b is hidden behind securing tab 60a, offset securing tab 58b is hidden behind securing tab 56a, and offset securing tab 60b is hidden behind securing tab 58a.

FIG. 5 is a perspective view of another corner 32 of frame assembly 22. As can be seen in FIG. 5, frame members 24 have flanges 62 projecting from third and fourth sidewalls 40 and 42. Flanges 62 can also be seen in FIGS. 6, 7, 8 and 10. Flanges 62 may be formed as extensions of sidewalls 40, 42 as is illustrated clearly in FIG. 10, or they could be add on pieces that are welded to frame members 24. In the preferred embodiment spot welds 64 are provided as illustrated in FIG. 5 to give flanges 62 and frame members 24 additional strength. Flanges 62 are provided for facilitating the mounting of frame panels 26 or otherwise such enclosing members. It should be noted that other means for bonding the box channel member together may be used without departing from the spirit or scope of the present invention such as stich welding or other mechanical bonding means. The flanges intersect at intersection 66 forming an inside corner for the frame assembly. Flanges 62 have an alternating pattern of holes 68 and slots 70. This alternating pattern has a two fold purpose. Firstly, it reduces the heat transfer surface by providing less material area for heat flow exposure. Secondly, it provides a universal pattern for screws to hold panels 26 and other such enclosing members in place.

Figure 6:
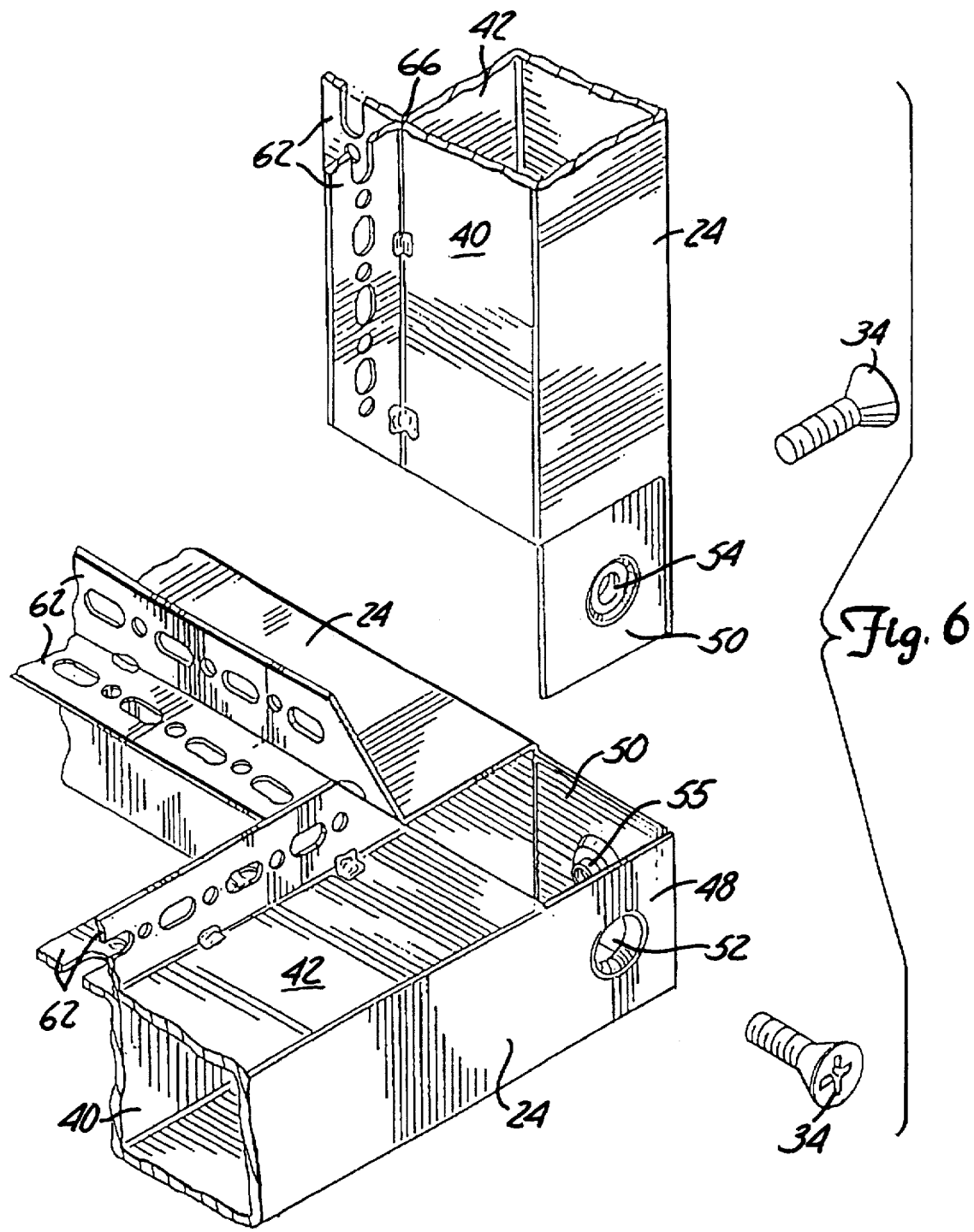
FIG. 6 is a partially exploded perspective view of the corner of FIG 5.
Figure 7:
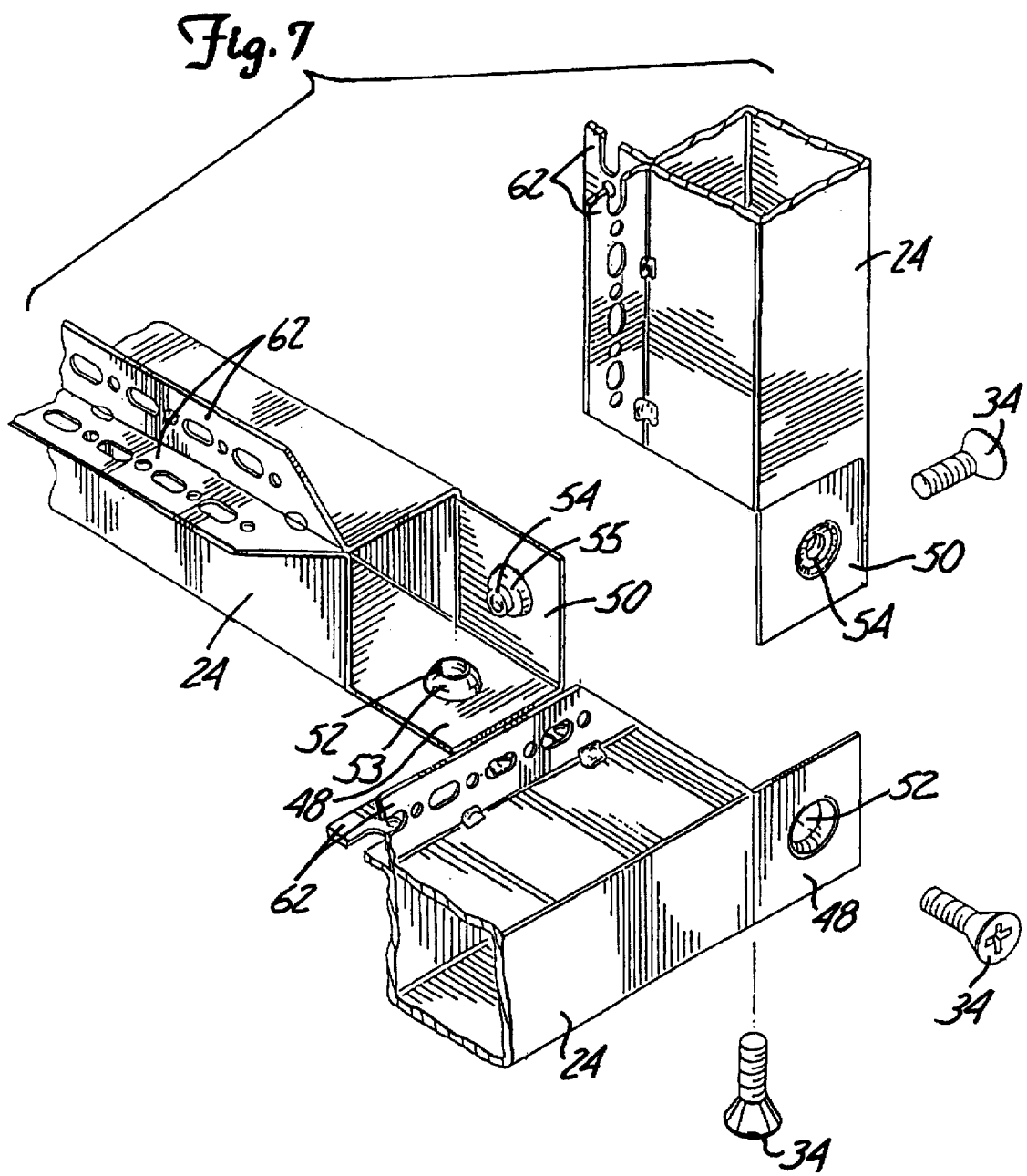
FIG. 7 is a fully exploded perspective view of the corner of FIG. 5.

FIG. 6 is a partially exploded perspective view of the corner assembly depicted in FIG. 5. Two fasteners 34 have been removed which allows one frame member 24 to be removed. The other two frame members 24 remain secured. FIG. 7 is a fully exploded perspective view of the corner assembly from FIG. 5. All three fasteners 34 have now been removed allowing all three frame members 24 freedom.

Figure 8:
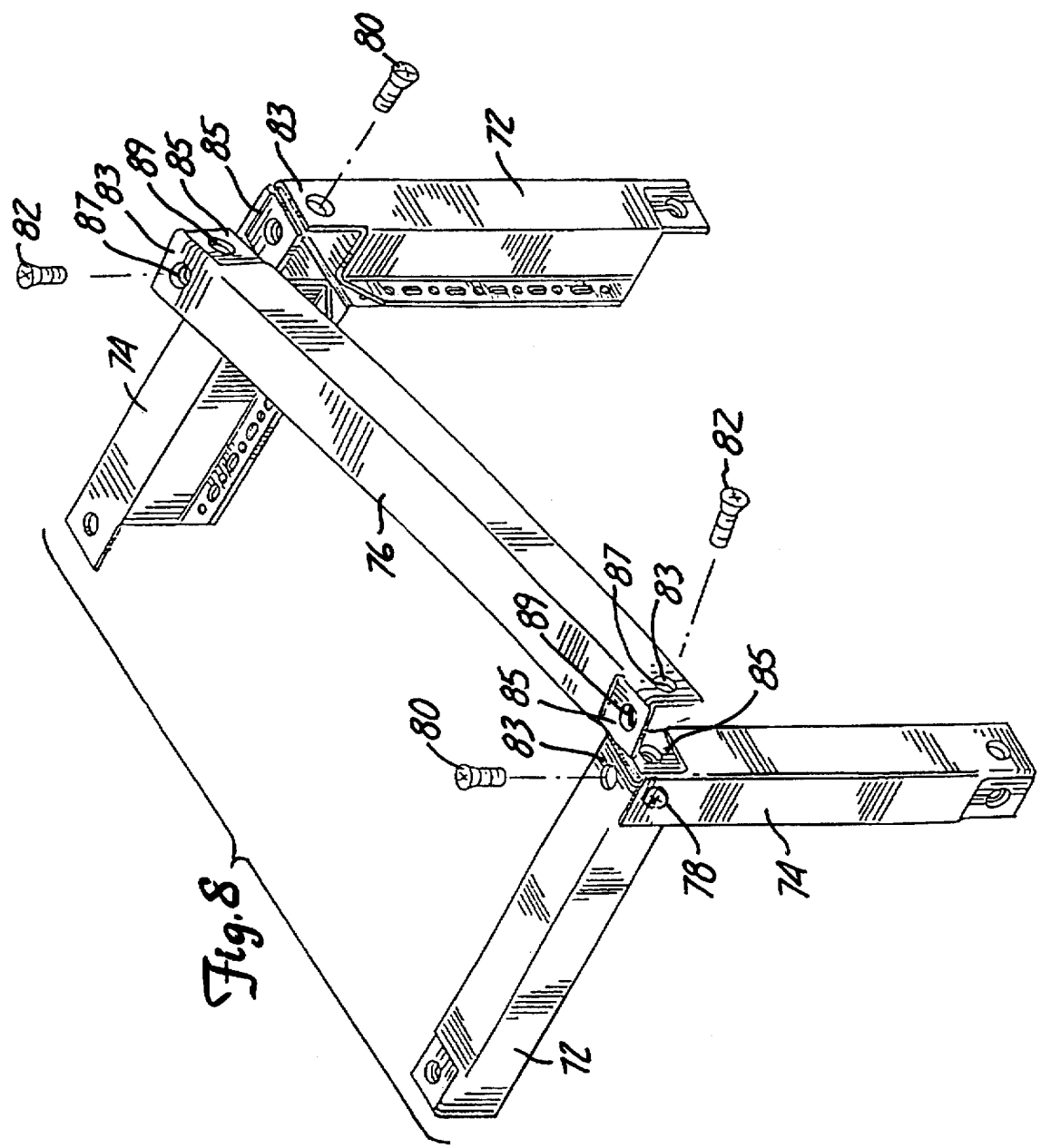
FIG. 8 is a partially exploded perspective view of a third frame member being joined to a first and second frame member which are already secured together.
Figure 8:
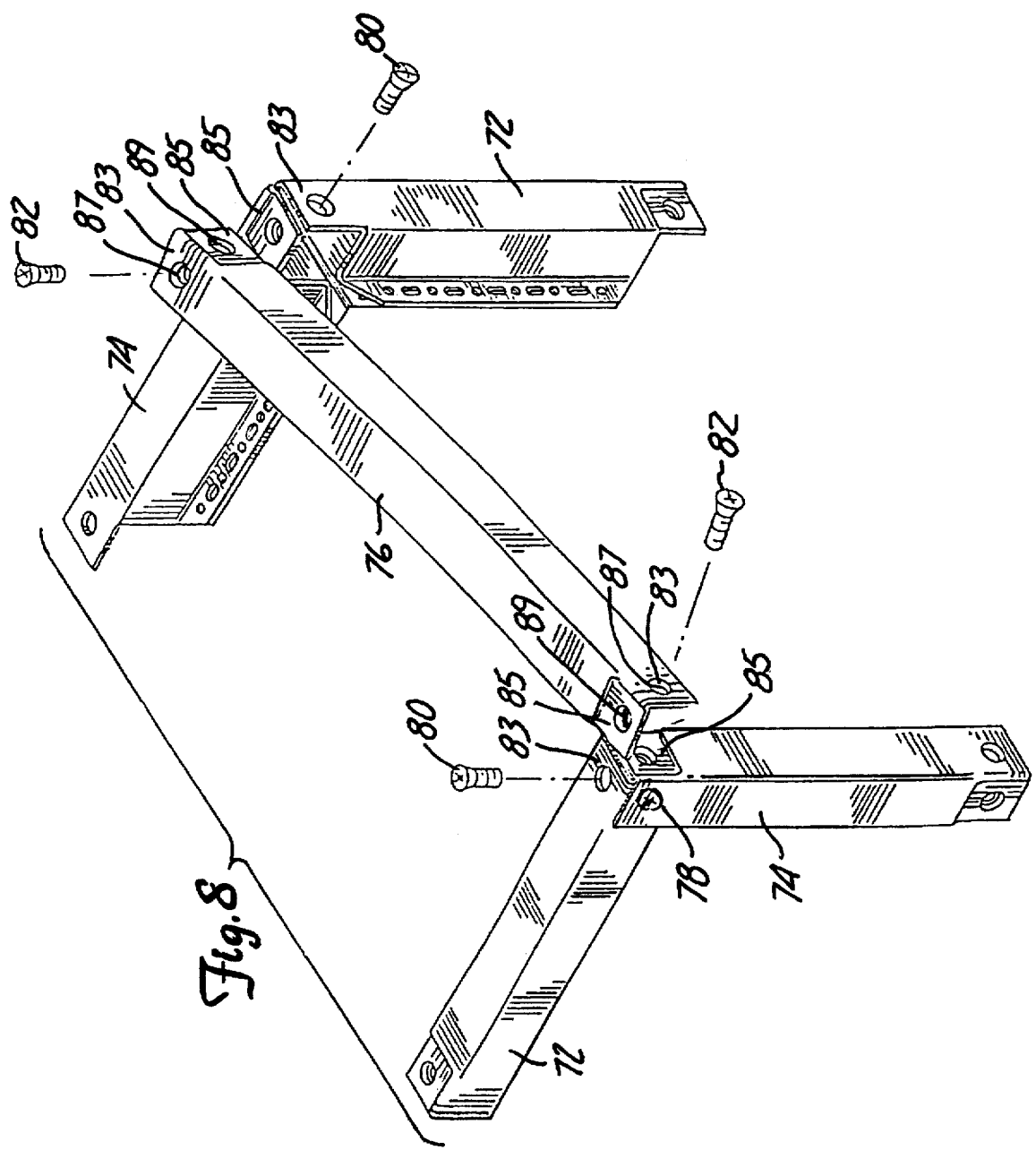

FIG. 8 illustrates a perspective view of a plurality of frame members 24 in various stages of assembly. Each of the frame members is manufactured as described above with respect to FIG. 3. As seen in FIG. 8, a pair of first and second frame members 72, 74 respectively, are held together with a first fastener 78. Second and third fasteners 80, 82, respectively, are provided to secure a third frame member 76 to first and second frame members 72, 74. First, second and third frame members 72, 74, and 76 have securing tabs 83 and offset securing tabs 85, and receiving cavities 87 and 89, respectively, as described above with respect to FIG. 3. To secure third frame member 76 to the pair of first and second frame members, offset securing tabs 85 of third frame member 76 are positioned inside of securing tabs 83 of first frame members 72 while securing tabs 83 of third frame member 76 are positioned outside of offset securing tabs 85 of second frame members 74. Second and third fasteners 80, 82 are then inserted through receiving cavities 87 and 89 to secure the first, second and third frame members together.

As stated above, FIG. 9 clearly illustrates how securing tabs 48 and offset securing tabs 50 mate together and how mating cones 53 and 55 mate together. Securing tabs 48 from a pair of frame members are illustrated outside of offset securing tabs 50. Mating cone 53 is illustrated nested with mating cone 55. Fasteners 34 are illustrated inserted through receiving cavities 52, 54. In the preferred embodiment of the present invention, fasteners 34 are an undercut flat countersunk bolt having a 5/16 inch diameter and a minimum strip-out torque of 200 inch-pounds, however, other similar fastening means are also considered to be within the spirit and scope of the invention.

Figure 10:
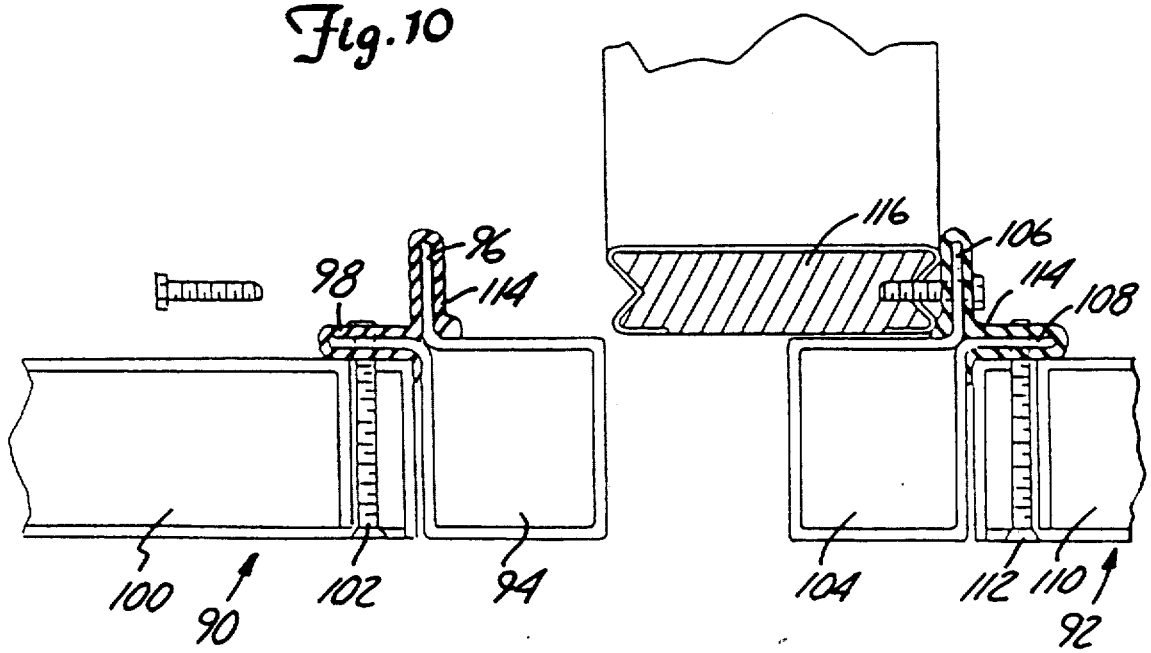
FIG. 10 is a sectional view taken along line 10—10 from FIG. 1.

FIG. 10 is a top perspective view of two frame assemblies 90, 92 being positioned adjacent to each other. A first frame member 94 is provided having first and second flanges 96, 98 projecting therefrom. A first panel member 100 is provided and is secured to flange 98 with a fastener 102. Similarly, a second frame member 104 is provided having first and second flanges 106, 108 projecting therefrom. A second panel member 110 is provided and is secured to flange 108 with a fastener 112.

Gaskets 114 are provided about the flanges of first and second frame members 94 and 104, respectively, as illustrated in FIG. 10. Gaskets 114 are provided to help prevent thermal bridging and to serve as an air seal around the perimeter of any panel members installed. The gaskets of the preferred embodiment are a foam gasket that is metered onto the flanges and then rises and cures to a finished gasket.

Other types of gaskets such as an extruded foam gasket can also be used without departing from the spirit or scope of the present invention.

An insulated liner 116 is provided for joining assembly modules together and forming an insulated and gasket seal. Insulated liner 116 is illustrated attached to flange 106, and would also be attached to flange 96. Liner 116 is sized such that when flange 96 is attached to liner 116, frame member 94 is abutting frame member 104. Insulated liner 116 helps guide individual frame assemblies together during installation and provides a substantially air tight joint to assure cabinet integrity.

We claim:

1. A modular frame assembly for an equipment cabinet comprising:
   a plurality of universal frame members wherein each of the plurality of universal frame members has a securing tab projecting therefrom and an offset securing tab projecting therefrom;
   a first countersunk bore formed side to a back side tab from a front side to a back side of the securing tab wherein the first countersunk bore forms a first substantially conical projection from the backside of the securing tab and wherein the first substantially conical projection has an outer diameter; and
   a second countersunk bore formed through each offset securing tab from a front side to a back side of the offset securing tab, wherein the second countersunk bore forms a second substantially conical projection from the backside of the offset securing tab and wherein the second substantially conical projection has an inside diameter larger than the outside diameter of the first substantially conical projection such that the second substantially conical projection of the plurality of universal frame members is sized to receive the first substantially conical projection from another one of the plurality of universal frame members.

2. The frame assembly as in claim 1 wherein the plurality of universal frame members are box channel frame members.

3. The frame assembly as in claim 2 wherein the plurality of universal frame members each have first, second, third and fourth sidewalls, and wherein the first and second sidewalls extend beyond the third and fourth sidewalls to form both the securing and offset securing tabs.

4. The frame assembly as in claim 1 wherein each of the offset securing tabs further includes a thread engaging surface that extends from the second substantially conical projection.

5. The frame assembly as in claim 1 further comprising a plurality of threaded fasteners insertable into the first and second countersunk bores to releasably secure the securing tabs to the offset securing tabs.

6. The frame assembly as in claim 1 further comprising first and second flanges projecting from the plurality of universal frame members.

7. The frame assembly as in claim 6 further comprising at least one enclosing member mounted to the first flanges of a pair of the plurality of universal frame members.

8. The frame assembly as in claim 6 further comprising a lining member mounted to the second flanges of a pair of the plurality of universal at frame members.

9. The frame assembly as in claim 8 wherein the lining member provides a substantially air tight seal between two adjacent frame members.

10. A modular frame assembly for an equipment cabinet having a plurality of members releasably secured together, the assembly comprising:
    a first frame member of a desired length wherein the first frame member is a box channel having first, second, third and fourth sidewalls and wherein the first and second sidewalls extend beyond the third and fourth sidewalls forming first and second tabs;
    a second frame member of a desired length connectable to the first frame member wherein the second frame member is a box channel having first, second, third and fourth sidewalls and wherein the first and second sidewalls extend beyond the third and fourth sidewalls forming first and second tabs and wherein the first tab of the first frame member mates with the second tab of the second frame member;
    a third frame member of a desired length connectable to the first and second frame members, wherein the third fame member is a box channel having first, second, third and fourth sidewalls and wherein the first and second sidewalls extend beyond the third and fourth sidewalls forming first and second tabs and wherein the first tab of the third frame member mates with the second tab of the first frame member and the second tab of the third frame member mates with the first tab of the second frame member;
    a first countersunk bore formed through each of the first tabs of the first, second and third frame members from a front side to a backside of the tabs wherein the first countersunk bore forms a first substantially conical projection from the backside of the first tabs and wherein the first substantially conical projection has an outer diameter; and
    a second countersunk bore formed through each of the second tabs of the first, second and third frame members from a front side to a backside of the second tabs, wherein the second countersunk bore forms a second substantially conical projection from the backside of the second tabs and wherein the second substantially conical projection has an inside diameter larger than the outside diameter of the first substantially conical projection.

11. The assembly as in claim 10 wherein the modular frame assembly comprises 12 frame members.

12. The assembly as in claim 10 wherein the second tabs are offset from the second sidewalls such that when mated with the first tabs, the offset second tabs are positioned inside the first tabs.

13. The assembly as in claim 12 wherein the first and second tabs are mated together and wherein the first substantially conical projections are received in the second substantially conical projections.

14. The assembly as in claim 10 wherein three fasteners are used to releasably secure the first, second and third frame members together, and wherein any two of the three fasteners must be removed to release one of the first, second or third frame members.

15. The assembly as in claim 10 wherein each frame member has a first and second end and wherein first and second tabs are formed at both the first and second ends of each frame member.

16. The assembly as in claim 15 wherein the second tabs on the first and second ends of each frame member are offset.

17. The assembly as in claim 10 wherein a first flange is provided on the third sidewall of each frame member and a second flange is provided on the fourth sidewall of each frame member.

18. The assembly as in claim 17 wherein the first flange is bent to form an angle of approximately 90° with the third sidewall and second flange is bent to form an angle of approximately 90° with the fourth sidewall.

19. The assembly as in claim 17 wherein the flanges have a plurality of receiving cavities.

20. The assembly as in claim 19 wherein at least one enclosing member is provided for mounting to the flanges.

21. The frame assembly as in claim 17 further comprising a lining member mounted to the second flanges of a pair of frame members.

22. The frame assembly as in claim 21 wherein the lining member provides a substantially air tight seal between two adjacent frame members.

* * * * *

UNITED STATES PATENT AND TRADEMARK OFFICE
CERTIFICATE OF CORRECTION

PATENT NO. : 5,713,651
DATED : Feb. 3, 1998
INVENTOR(S) : Essig et al.

It is certified that error appears in the above-identified patent and that said Letters Patent is hereby corrected as shown below:

Please delete drawing sheet 8 of 8 and substitute drawing sheet 8 of 8 as per attached.

Column 1, line 49, please insert the word "be" between the words "would" and "desirable".

Column 1, line 62, please change the word "have" to the word "has".

Column 5, line 20, please delete the phrase "side to a back side" and replace with the phrase "through each securing".

Column 5, line 62, please delete the word "at".

Column 6, line 18, please change the word "fame" to the word "frame".

Signed and Sealed this

Twenty-sixth Day of May, 1998

*Attest:*

BRUCE LEHMAN

*Attesting Officer*      *Commissioner of Patents and Trademarks*